Dec. 18, 1962 E. C. NORVELL, JR 3,069,092
LIQUID VAPORIZER
Filed Jan. 15, 1962 3 Sheets-Sheet 1
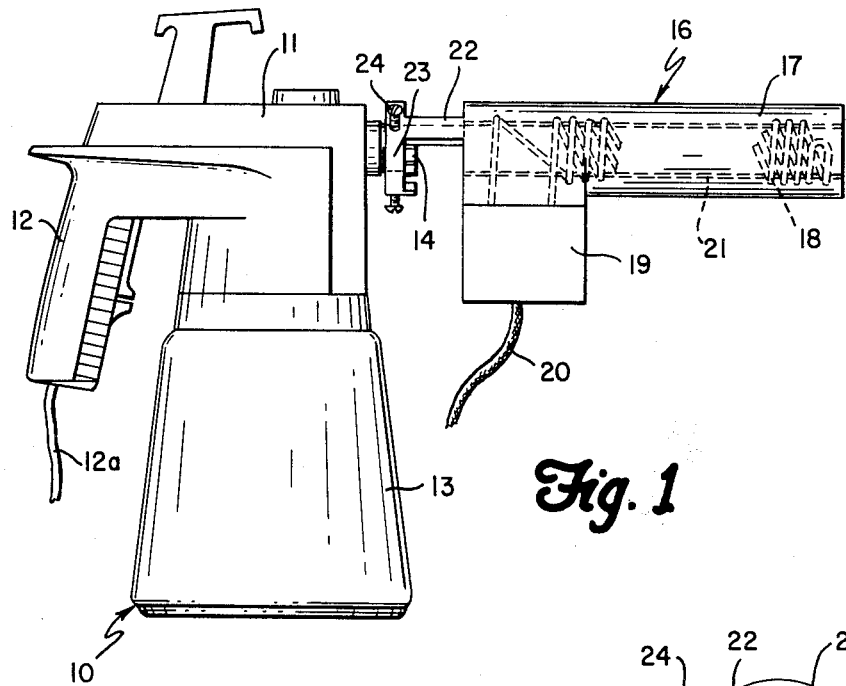
Fig. 1
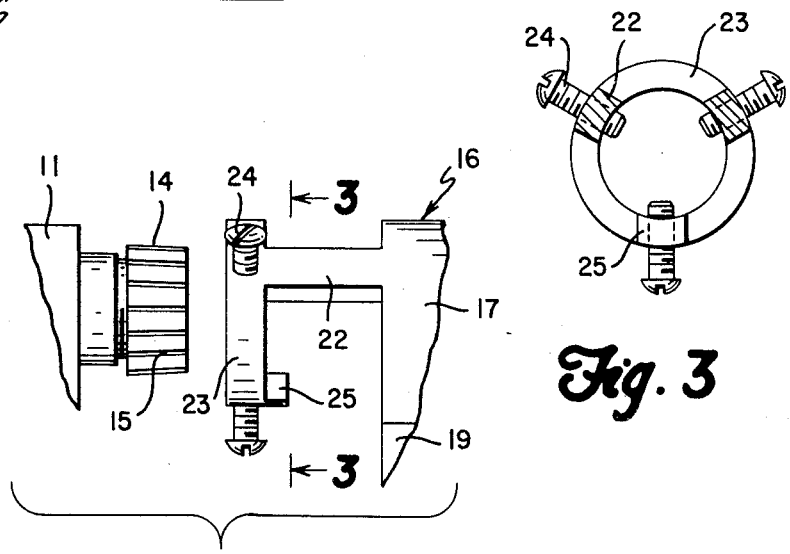
Fig. 2
Fig. 3
INVENTOR.
EDMUND C. NORVELL JR.
BY
Malcolm W. Fraser
ATTORNEY

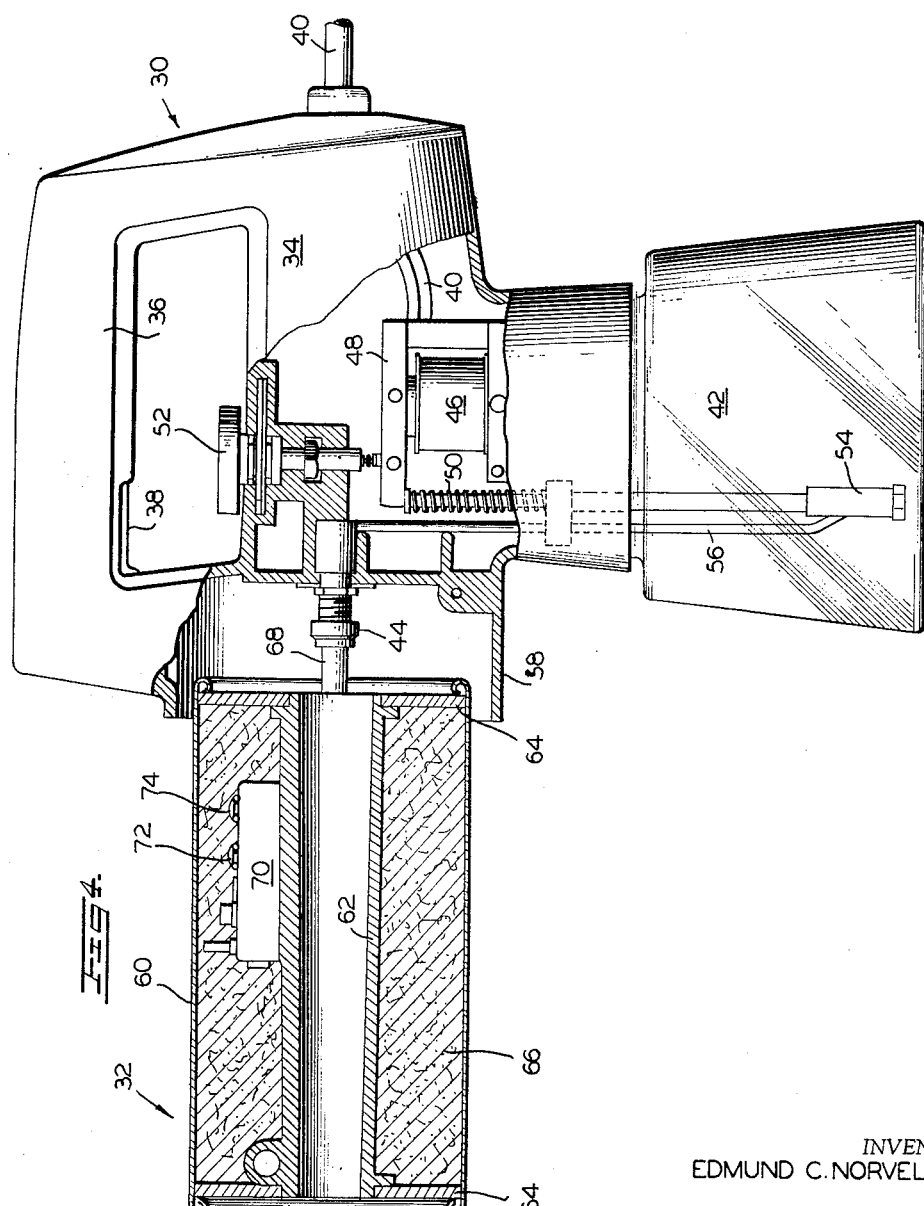

Dec. 18, 1962 E. C. NORVELL, JR 3,069,092
LIQUID VAPORIZER
Filed Jan. 15, 1962 3 Sheets-Sheet 3
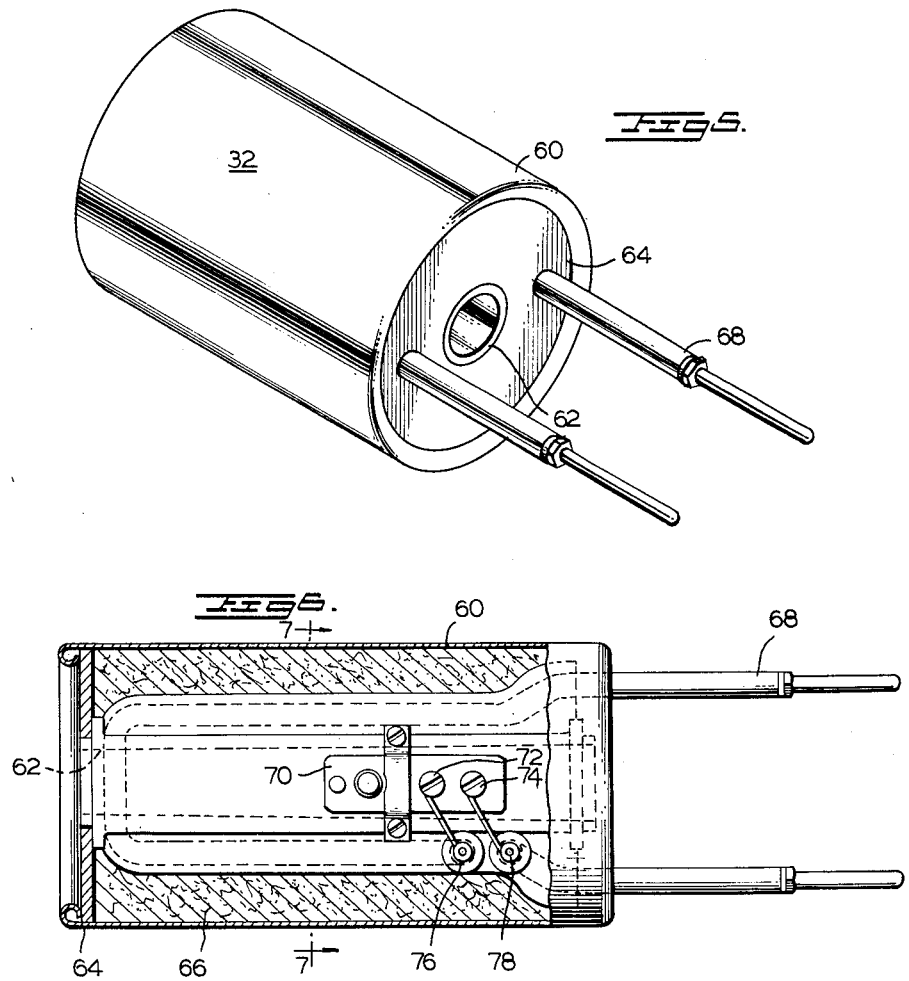
INVENTOR
EDMUND C. NORVELL JR.
BY
ATTORNEY

United States Patent Office 3,069,092
Patented Dec. 18, 1962

3,069,092
LIQUID VAPORIZER
Edmund C. Norvell, Jr., 435 Dennis St., Adrian, Mich.
Filed Jan. 15, 1962, Ser. No. 168,004
2 Claims. (Cl. 239—133)

This invention relates to vaporizers but more particularly to vaporizers for liquids, such as insecticides for creating a fog to exterminate or repel insects by an effective coverage of the area to be treated.

An object is to produce a simple and efficient liquid vaporizer which has the new and improved features of construction, arrangement and operation hereinafter described.

Another object is to produce a vaporizer which is suitably heated and into which atomized liquid is introduced for breaking up the atomized particles through the medium of heat and expelling the same in the form of a fog.

A further object is to produce an attachment for liquid atomizers which receives the atomized liquid and at the same time aspirates outside air for mixture therewith, heats the air-spray mixture in such manner as to break up same into smaller, more volatile particles, and then discharges the same as a fog in substantially continuous manner.

A still further object is to produce a spray gun-vaporizer assembly having novel features by which atomized liquid mixed with air is heated for creating a vapor which may be forcefully discharged in a vapor form.

Other objects and advantages of the invention will hereinafter appear, and, for purposes of illustration but not of limitation, an embodiment of the invention is shown on the accompanying drawings, in which FIGURE 1 is a side elevation of a spray gun and vaporizer assembly;

FIGURE 2 is an enlarged fragmentary side view of the discharge end portion of the spray gun and the adjacent end portion of the vaporizer barrel, the parts being separated from each other for purposes of clarity;

FIGURE 3 is a transverse sectional view substantially on the line 3—3 of FIGURE 2;

FIGURE 4 is a side elevational view partially in section and with certain portions cut away of a modified version of the spray gun and vaporizer assembly illustrated in FIGURES 1 to 3;

FIGURE 5 is a perspective view of the vaporizer barrel of the assembly illustrated in FIGURE 4;

FIGURE 6 is a top plan view with portions cut away to more clearly illustrate the vaporizer barrel illustrated in FIGURE 5; and FIGURE 7 is a sectional view of the vaporizer barrel taken along lines 7—7 of FIGURE 6.

The illustrated embodiment of the invention of FIGURES 1, 2, and 3 comprises an electrically operated liquid atomizer or spray gun 10, which, as shown, is provided with a body 11 having a trigger handle 12, a lead cord 12a, a detachable liquid-containing jar 13 and an atomizing nozzle 14. The nozzle 14, as shown, is slightly tapered and is provided with a series of parallel outwardly projecting horizontal ridges 15.

The particular form of the atomizer forms no part of the present invention. Suffice it to say that in the form shown the liquid in the jar 13 is forced by pump action or otherwise therefrom to the outside in spray form through the atomizing nozzle 14. Any satisfactory atomizer may be employed, either power or hand operated, so long as it discharges the liquid therefrom in atomized spray form. A suitable spray gun for this purpose is the BVI electric sprayer manufactured by Burgess Vibrocrafters, Inc., of Grayslake, Illinois, and this reference is made since the device illustrated on the drawings is one sold by such concern and one which in practice has been satisfactory.

More particularly in accordance with this invention, a vaporizer 16 is attached to the atomizer nozzle 14 and receives the spray of atomized liquid therefrom. The vaporizer 16 is in the form of an elongate cylindrical barrel 17 which may be of aluminum. Embedded in the wall of the barrel 17 is a coil 18, which may be of Nichrome wire, and, as shown, the coil is suitably insulated from the body of the barrel 17 and extends substantially throughout the length of the barrel. The terminals of the coil lead to a suitable thermostat 19 from which extends a lead cord 20 for supplying electrical energy. Within the coil 18 and extending from end to end of the barrel is a central metallic tube 21, the inside of which is smooth and free from any burrs or irregularities. The smoothness of the inside of the tube 21 is found important for carrying out the efficient operation of the vaporizing barrel.

Integral with the barrel 17 and projecting rearwardly therefrom is a pair of bracket arms 22 which are integral at their rear ends with an attaching ring 23. In screw threaded engagement with the ring 23 are three equidistantly spaced set screws 24, and at the lower part of the ring is a forwardly extending relatively short arm 25 which is also integral with the ring. The arms 22 and 25 are equidistantly spaced from each other as shown in FIGURE 3.

The vaporizer 16 is applied to the atomizer 10 by slipping the ring 23 over the outside of the atomizing nozzle 14. The set screws 24 enter spaces between the ridges 15, and, when tightened, the vaporizing barrel is secured in position of use. Preferably the relatively short under arm 25 has its free end approximately flush with the forward end of the nozzle 14.

It will be noted that a substantial space exists between the front end of the atomizing nozzle 14 and the rear end of the barrel 17 and the spray discharged from the atomizing nozzle 14 passes through an open space before it enters the barrel 17. As a result, outside air is aspirated into the barrel by the atomized liquid and this provides an air-liquid mixture, which is found to be important for achieving the desired vaporization of the liquid.

The vaporizing barrel 16 must be heated to a temperature of the order of 650° F. and such temperature is maintained by the thermostat 19. Usually several minutes are required to bring the barrel to the proper temperature and after the barrel 16 has reached the proper temperature, then by energizing the atomizer 10, the atomized liquid is introduced under pressure into the barrel 17, thereby drawing in a quantity of outside air along with it. The atomized particles upon impingement against the inside of the hot tube 21 breaks up the atomized particles into smaller, more volatile particles resulting in vaporization and emitting a fog from the discharge end of the barrel. This will proceed continuously so long as the atomized liquid is forced into the barrel.

Although the device may be used for the atomization of many different liquids, it is found particularly useful in the atomization of insecticides, which usually have a light oil base, and vaporize most satisfactorily, the fog completely filling a room or other closed space for effectively killing insects upon contact. Manifestly the insecticide employed should be of such chemical composition that it can be vaporized without creating a harmful gas or residue. The device also has utility around patios, lawns and open areas for the control of mosquitoes, flies and similar insects.

It should be understood that the temperature within the vaporizing barrel 16 will have to be adjusted according to the particular liquid employed. Some liquids require a higher or a somewhat lower temperature to effect satisfactory vaporization. Likewise it will be understood that the length and diameter of the vaporizing barrel 16 is so chosen as to effect the most efficient operation with respect to a particular liquid. It is emphasized, however, that the vaporizing barrel 16 must be in direct alignment with the atomizing nozzle 14 so that the spray will properly be projected inside the barrel and that adequate outside air will be aspirated to secure the proper air-liquid mixture to secure the desired vaporization.

Referring to another embodiment of the invention illustrated in FIGURES 4, 5, 6, and 7, there is shown a liquid atomizer and vaporizer assembly comprising an electrically operated liquid atomizer 30 and an electrically heated liquid vaporizing chamber 32. The liquid atomizer 30 is provided with a body 34 having a handle 36, a trigger actuated switch 38, electrical power leads 40, a detachable liquid container 42, and an atomizing nozzle 44.

Electrical energy is supplied to a solenoid 46, disposed within the body 34, through leads 40. The armature of the solenoid 46 is effective to impart vertical movement to a bar 48 which is pivotally mounted at one end while the other is in contact with a spring biased pump piston rod 50. The vertical movement of the bar 48 is limited and controlled by a screw controlled adjustment assembly 52. By the adjustment of the device 52 the length of the stroke imparted to the pump piston rod may either be shortened or lengthened.

The piston rod 50 is associated with a pump 54, disposed within the liquid container 42, and is provided with a conduit or passageway 56 through which liquid may pass to the outlet thereof which is provided with the nozzle 44. It will be noted that the nozzle 44 is disposed within an annular space defined by a forwardly extending annular collar 58 which is typically an integral extension of the body 34.

The vaporizing chamber 32 is comprised of an outer casing 60 and an inner coaxially extending tapered barrel 62 spaced therefrom by a pair of insulating end spacer elements 64. Within the space between the outer casing 60 and the barrel 62, there is provided an insulating material 66. It has been found that by tapering the barrel 62, additional thrust is imparted to the vaporized material.

The barrel 62 is heated by electrical current which is supplied from the electrical leads 40 through a pair of bayonet type prong elements 68 which extend from the barrel 62 through suitable apertures in the rear spacer element 64 and are adapted to be received in properly disposed receptacles within the body 34. The receptacles, not shown, are electrically coupled to the source of electrical energy through the leads 40. In addition to functioning as a path for electrical current, the prong elements 68 provide a strong separable mechanical connection between the liquid atomizer 30 and the vaporizing chamber 32.

To maintain a predetermined temperature of the barrel 62, there is provided a thermostat control unit 70 having terminals 72 and 74 which are connected through suitable electrically conductive leads to associated barrel terminals 76 and 78, respectively. The thermostat 70 functions to interrupt the flow of current heating the barrel 62 when the barrel temperature exceeds a predetermined, typically about 575° F., value.

In operation, the assembly is initially connected to the normal line current through the lead 40 which immediately causes a flow of current through the vaporizing barrel 62 to heat the same. Typically, a warm-up time of approximately six minutes is necessary for complete preheating of the vaporizing barrel 62. After the barrel 62 has reached the predetermined temperature which typically takes about six minutes the operator pulls the trigger 38 on the underside of the handle 36 which establishes an electrical current path to the solenoid 46 to effectively energize the same and cause the piston rod 50 to be reciprocated through a stroke length determined or limited by the adjustment device 52 which regulates the rate of liquid flow. The pump 54, driven by the piston rod 50, forces the liquid within the container 42 upwardly through the outlet passage 56 and thence through the atomizing nozzle 44.

The nozzle 44 feeds atomized liquid through a spray pattern in the form of a completely filled cone the sides of which have an angularity of the order of 40° into the thermostatically controlled barrel 62 of the vaporizing chamber 32. The transient liquid absorbs heat within the barrel 62 in sufficient amount to cause vaporization thereof and surges from the outlet end of the barrel in the form of a dense fog. It will be appreciated that the atomized liquid emitted from the nozzle has not been mixed with any air until it leaves the nozzle 44 at which point the particles of atomized liquid effectively entrain air from within the zone between the rear portion of the vaporizing chamber 32 and the forward end of the atomizer 30. The velocity of the emergent atomized liquid stream from the nozzle 44 enables the capture of air which is aspirated to the aforesaid zone through the annular space between the outer surface of the casing 60 and the inner surface of the annular collar 58 thereby forming a stream of air having liquid particles of insecticide dispersed therein prior to its entry into the vaporizing barrel 62. The amount of air entering the vaporization barrel 62 is determined by the atomized spray emitted from the nozzle 44 and is important with respect to the overall effective operation and safety of the invention.

Since the majority of commercially available liquid insecticides include inflammable components, extreme attention must be given toward preventing the temperature of the mixture from exceeding its flash point. In the operation of the vaporizer of the invention the amount of air passing through the vaporizing chamber is dependent upon and proportioned at all times to the rate of flow of atomized spray from the nozzle. Thus when because of depletion of the insecticide mixture or obstruction of the spray nozzle or for any other reason, the flow of insecticide spray into the vaporizer chamber stops the flow of air likewise stops and is immediately resumed when the insecticide spray is restarted. As a result there is always an adequate air flow to carry the fogged insecticide out of the chamber and to prevent thereby any accumulation of liquid insecticide in the chamber. When there is no insecticide spray passing into the vaporizer chamber there is likewise no flow of air. Moreover, since the flow of air into the vaporizer chamber is caused by, and only by the passage of insecticide spray into the chamber accidental or inadvertent shutting off of the air flow becomes impossible so that no passage of spray into the chamber can occur without carrying with it sufficient air to prevent any retention or accumulation of insecticide in the chamber.

A typical operating example of the apparatus embodying the principles of the invention has been found to have the following dimensions:

| | Inches |
|---|---|
| Distance from nozzle 44 to inlet of barrel 62 | .4375 |
| Diameter of inlet of barrel 62 | .875 |
| Diameter of outlet of barrel 62 | .750 |
| Length of barrel 62 | 6 |

In practice it is found that apparatus having the above dimensions and equipped with a discharge orifice of the nozzle of the order of .0135 inch and employing a liquid pressure of approximately 40 pounds per square inch, a spray volume of between two and one-half and four and one-half ounces per minute is achieved with a spray velocity per second at the discharge orifice of the nozzle 44 of approximately seventy five feet. This provides at the discharge orifice of the nozzle 44 a completely filled cone of spray having an angularity of about 40°.

Among the numerous advantages of the invention is that a principal cause of the clogging and plugging-up of apparatus of the prior art has been eliminated. Since the insecticide used in the apparatus is not heated until after it is atomized, the pumping and atomizing equipment is maintained free from the sticky and gummy substances which may result when the insecticides are heated. Clearly this advantage results in eliminating the heretofore problem of frequent dismantling and cleaning of the parts of the atomizing equipment. Further, since the orifice in the atomizer remains unclogged, a steady and even flow of atomized particles of the liquid results.

A further advantage resides in the fact that this apparatus can advantageously employ insecticide formulations available on the market and does not require special formulation to secure desired results. This is due to the fact that the heat necessary for satisfactory operation is relatively low so that the insecticide is neither broken down nor does it create a substance which gums up and in short order renders the apparatus useless and not infrequently creates a dangerous fire hazard.

Numerous changes in details of construction, arrangement and choice of materials may be effected without departing from the spirit of the invention, especially as defined in the appended claims.

This application is a continuation-in-part application of my copending application Serial No. 59,713 entitled "Liquid Vaporizer" filed September 30, 1960, now abandoned.

I claim:

1. A method of forming a dispersion of vaporized liquid insecticide in a current of air comprising admixing air with a solid liquid atomized spray of liquid particles solely by the aspirating action of said atomized spray and passing the mixture thereby produced through an elongated cylindrical zone while radiating heat into the mixture from the boundary of said zone to effect vaporization of the liquid particles therein.

2. A vaporizer for liquid insecticides and the like comprising means including a nozzle, a reservoir for the liquid, and means for delivering a solid stream of the liquid from said reservoir to said nozzle under pressure for ejecting from the nozzle solely liquid in an expanding cone of atomized spray; an elongate barrel aligned in front of and spaced a relatively short distance from said nozzle to define an annular embracive air passage about the periphery of said spray whereby a current of air is aspirated by said spray from said embracive air passage into said barrel and forced into intimate admixture with the spray; and means for heating said barrel to effect vaporization of the spray particles in the mixture of air and spray passing through said barrel whereby the liquid spray entering the barrel controls the amount of air admixed therewith.

References Cited in the file of this patent

UNITED STATES PATENTS

| | | |
|---|---|---|
| 2,123,604 | Johnson | July 12, 1938 |
| 2,980,786 | Chilton | Apr. 18, 1961 |

FOREIGN PATENTS

| | | |
|---|---|---|
| 175,972 | Austria | Sept. 10, 1953 |
| 1,167,354 | France | July 7, 1958 |
| 1,211,461 | France | Oct. 12, 1959 |